Nov. 25, 1947.  D. E. WILLIS  2,431,441
SLIDABLE ANCHORAGE BRAKE AND ADJUSTMENT THEREFOR
Filed Feb. 19, 1945  2 Sheets-Sheet 2
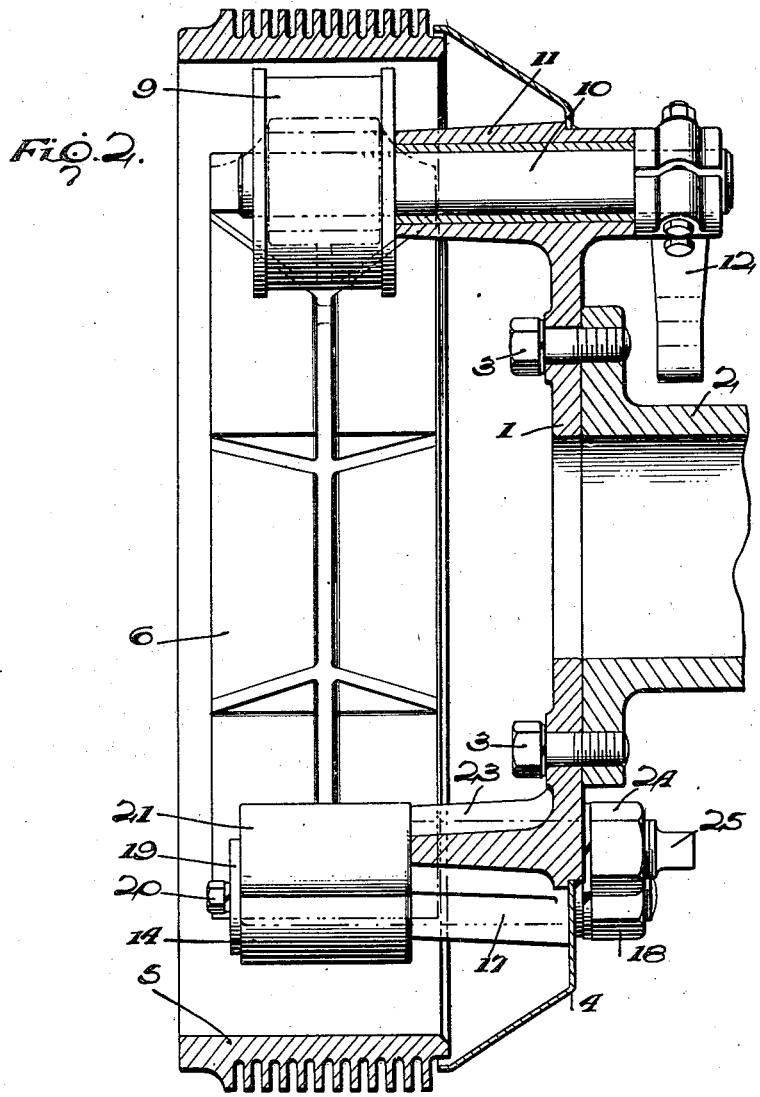
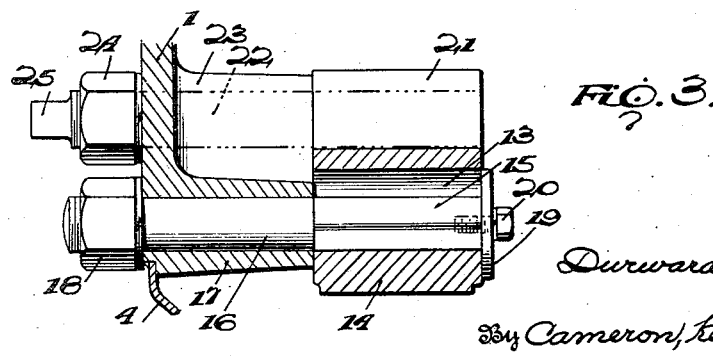
Inventor
Durward E. Willis
By Cameron, Kerkam & Sutton
Attorneys Patented Nov. 25, 1947

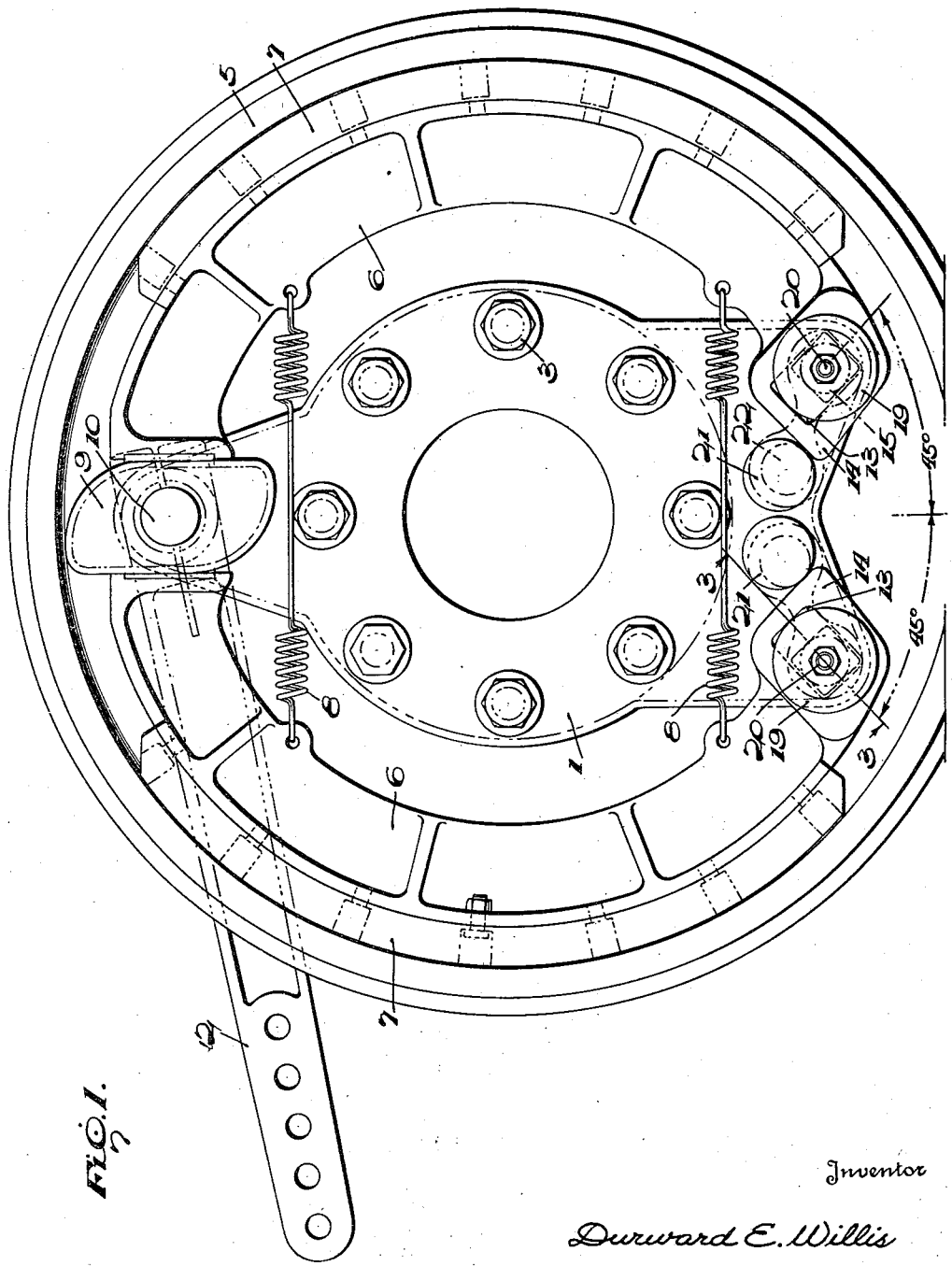

2,431,441

UNITED STATES PATENT OFFICE 2,431,441

SLIDABLE ANCHORAGE BRAKE AND ADJUSTMENT THEREFOR

Durward E. Willis, Tampa, Fla.

Application February 19, 1945, Serial No. 578,630

3 Claims. (Cl. 188—78)

This invention relates to wheel brakes for automotive such as automobiles, trucks, trailers and the like.

A typical construction of friction brake for such purposes comprises a pair of approximately semi-circular brake shoes on opposite sides of the wheel axis, two adjacent and corresponding ends of the shoes being anchored on pivot pins or the like and the other two ends being arranged to be spread apart by a suitable brake operator such as a cam, hydraulic cylinder, etc. The shoes are thus swung outwardly on their anchor pivots against the action of a return spring or springs to bring their unanchored ends into frictional engagement with the rotating brake drum. It is well known that in such brake mechanisms, the shoes are not forced into contact with the drum with a uniform pressure throughout their length, with the results that the maximum benefit of the brake lining is not realized on the one hand, while on the other hand the wear of the brake linings is uneven, being less toward the anchored ends of the shoes.

It has been proposed to eliminate these disadvantages by spreading the shoes at both ends, as for example by duplicating the brake operating member, or by the use of auxiliary links and levers or similar mechanical means for spreading both ends of the shoes from a single operating member. However, such arrangements involve an undesirable complication of the brake structure with added initial expense and maintenance. It has also been proposed to anchor the ends of the shoes by pin and slot connections or their equivalent, with the slot axes arranged so that the circumferential frictional drag of the brake drum wedges the slotted ends of the shoes outwardly against the drum. While such arrangements tend to increase the effectiveness of the braking action, the wedging effect also tends to lock the brake so that it does not release properly, and experience has shown that such wedging and locking effects are not permissible in practice.

The present invention provides a simple, effective and safe brake in which uniform application and even wear of linings are obtained without structural complication and without any tendency to wedge or lock so that the brake is always under the control of the driver. It also permits close and accurate adjustment of clearances between the linings and the drum to allow for wear. Other features will appear hereinafter as the description proceeds.

One embodiment of the invention has been illustrated in the accompanying drawings, but it is to be expressly understood that said drawings are for purposes of illustration only and are not to be taken as a definition of the limits of the invention, reference being had to the appended claims for this purpose.

In the drawings,

Fig. 1 is a side view of brake mechanism embodying the invention;

Fig. 2 is a vertical section on the center line of Fig. 1; and

Fig. 3 is a section on the line 3—3 of Fig. 1.

The invention may be used with any suitable type of wheel, brake drum construction, and brake supporting means, and it will be understood that the details of these parts as shown herein are not part of the invention. In the form shown, a brake supporting plate 1 is secured to the axle housing 2 of the vehicle by means of studs 3, and a dust guard 4 is secured to the plate 1 as by welding so as to cooperate with the brake drum 5 in forming an enclosure for the brake. It will be understood that this drum is carried by and rotates with the wheel of the vehicle in any suitable manner.

A pair of substantially semi-circular brake shoes 6 are supported by the plate 1 in position to be moved outwardly until their linings 7 engage the drum 5. Normally these shoes are held inwardly clear of the drum by suitable resilient means such as springs 8, but they are adapted to be spread outwardly at one end by suitable operating means here shown as a cam 9. Any suitable means may be employed for operating the cam, and as shown the cam shaft 10 rotates in a sleeve bearing 11 formed as part of the plate 1, the end of the shaft beyond the plate carrying an operating arm 12 which may be actuated mechanically or hydraulically or pneumatically by well known means.

The other ends of the brake shoes 6 are mounted on the backing plate 1 by pin and slot connections arranged so that rotation of the cam 9 causes each shoe to move into engagement with the drum throughout its entire length as explained hereinafter. The slots 13 are preferably formed in extensions 14 of the shoes beyond the ends of the linings 7 and engage pins 15 mounted on and projecting from the plate 1 in any suitable manner. The pins themselves may have any desired shape, provided that they permit a small amount of rotation of the shoes relative thereto as well as sliding movement of the slotted shoe extensions, and are preferably rectangular in cross section with the slots fitting loosely enough to permit the desired relative rotation. The shanks 16 of these pins, which may be round, are inserted in sleeves 17 formed on the plate 1, and the pins are held in place by nuts 18 on the ends of the shanks while retaining washers 19 and screws 20 hold the shoe extensions 14 on the pins but permit relative movement therebetween.

When the cam 9 is rotated, the end of each shoe is first moved into frictional contact with the drum. This movement is permitted by swinging of the shoe on its pin, as the amount of swinging movement required is very small. The pressure of the cam at one end, together with the reaction of the rotating drum, would tend to bow or bulge the shoe if its other end were fixed, but first results in outward sliding movement of the slotted end of the shoe in the present instance. Preferably the direction of the slot axis is arranged so that the slotted end of the shoe will slide relatively freely on its pin under the action of these forces. Thus the entire length of the shoe will be brought into frictional engagement with the drum.

The desired angular position of the axes of the slots can be defined with relation to a drum diameter lying midway between the shoes which, as seen in Fig. 1, is the vertical center line of the figure. As the slot axes are extended inwardly toward the center of the drum, they converge toward one another and intersect the aforesaid diameter at an angle which as shown in Fig. 1 is about 45°. In most cases such an angle will be about right for most effective application of the brake shoes in the manner explained above, and although variations of the angle may be permissible under different conditions, it should be maintained within approximate limits of 15° and 60°.

It will also be observed that within these limits of angularity of the slot axes, there is little or no tendency for the brake to wedge or lock. In fact, in the neighborhood of the preferred angle of 45°, wedging cannot take place because the angle between the tangent and the slot axis at any point is greater than 90°. Hence the shoe tends to break away from the drum when the pressure on the actuating cam ceases, and this tendency together with the springs 8 insures positive and quick release of the brake. It will be understood that this non-wedging relationship exists at other angles of the slot axis relative to the drum diameter both above and below the preferred angle of 45°. For practical purposes there will be no material wedging effect until this angle decreases substantially beyond the point where the slot axis becomes radial, and within the limits of angularity mentioned above, no condition arises where there is danger of locking of the brake.

The construction thus far described lends itself to easy and convenient adjustment of the brake shoes to take up wear of the liners by the use of simple adjustable back stops for limiting the innermost positions of the slotted extensions 14 relative to the pins 15. Preferably these back stops comprise eccentrics rotatably mounted on the supporting plate 1, and in the form shown, they comprise cylindrical stop members 21 that are integral with but eccentric relative to shanks 22, the latter being rotatable in bearing sleeves 23 formed as part of the plate 1 and being held in adjusted position by lock nuts 24. The ends 25 of the shanks which project beyond the lock nuts are preferably squared or otherwise suitably shaped for application of an adjusting tool.

By the use of these eccentric back stops, small clearances can be maintained at all times between the brake drum and the brake linings at the slotted ends of the shoes, in spite of wear of the liners. This adjustment is secured without affecting in any way the positions of the pins 15 or the action of the brake. At the same time the fine adjustment reduces to a minimum the amount that the brake operating means must move in applying the brake, a feature which is of particular importance with vacuum brakes where the range of movement of the diaphragm is limited.

While only one embodiment of the invention has been described and illustrated in the drawings, it will now be apparent to those skilled in the art that it is susceptible of a variety of mechanical forms and that various changes may be made in the form, details of construction and arrangement of the parts without departing from its spirit. Reference should therefore be had to the appended claims for a definition of the limits of the invention.

What is claimed is:

1. A vehicle brake comprising a rotating brake drum, a non-rotating supporting plate, a pair of approximately semi-circular brake shoes carried by said plate, brake operating means for spreading corresponding ends of said shoes outwardly into frictional engagement with said drum, pins projecting from said plate, the opposite ends of said shoes being slotted to slide on said pins with the slot axes converging toward the center of the drum and intersecting the intermediate drum diameter at an angle within the approximate limits of fifteen and sixty degrees, resilient means tending to slide the slotted ends of the shoes inwardly relative to said pins, and adjustable stops limiting the inward movement of said slotted ends relative to the pins for adjusting the clearance between the slotted ends of the shoes and the drum.

2. A vehicle brake comprising a rotating brake drum, a non-rotating supporting plate, a pair of approximately semi-circular brake shoes carried by said plate, brake operating means for spreading corresponding ends of said shoes outwardly into frictional engagement with said drum, pins projecting from said plate, the opposite ends of said shoes being slotted to slide on said pins with the slot axes converging toward the center of the drum and intersecting the intermediate drum diameter at an angle within the approximate limits of fifteen and sixty degrees, resilient means tending to slide the slotted ends of the shoes inwardly relative to said pins, and rotatable stop members eccentrically mounted on said plate inwardly of said slotted ends for limiting the inward movement thereof relative to the pins and thereby adjusting the clearance between the slotted ends of the shoes and the drum.

3. A vehicle brake comprising a rotating brake drum, a non-rotating supporting plate, a pair of approximately semi-circular brake shoes carried by said plate, brake operating means for spreading corresponding ends of said shoes outwardly into frictional engagement with said drum, anchor pins projecting from said plate and having flat parallel sides, the opposite ends of said shoes being slotted to slide on the flat sides of said pins with the slot axes converging toward the center of the drum and intersecting the intermediate drum diameter at an angle within the approximate limits of fifteen and sixty degrees, the sides of the slots having a loose fit on the pins to permit limited rotation of the shoes relative thereto, resilient means tending to slide the slotted ends of the shoes inwardly relative to said pins, and rotatable stop members eccentrically mounted on said plate inwardly of said slotted ends for limiting the inward movement thereof relative to the pins and thereby adjusting the clearance between the slotted ends of the shoes and the drum.

DURWARD E. WILLIS.

REFERENCES CITED

The following references are of record in the file of this patent:

UNITED STATES PATENTS

| Number | Name | Date |
|---|---|---|
| 2,208,293 | Hayes et al. | July 16, 1940 |
| 1,878,912 | Stoner | Sept. 20, 1932 |
| 1,974,176 | Dick | Sept. 18, 1934 |